United States Patent
Oberberger

(10) Patent No.: US 9,811,972 B2
(45) Date of Patent: Nov. 7, 2017

(54) SYSTEM AND METHOD FOR AUTHENTICATING STORAGE MEDIA WITHIN AN ELECTRONIC GAMING SYSTEM

(71) Applicant: Video Gaming Technologies, Inc., Franklin, TN (US)

(72) Inventor: Michael Oberberger, Nashville, TN (US)

(73) Assignee: Video Gaming Technologies, Inc., Franklin, TN (US)

(*) Notice: Subject to any disclaimer, the term of this patent is extended or adjusted under 35 U.S.C. 154(b) by 262 days.

(21) Appl. No.: 14/145,362

(22) Filed: Dec. 31, 2013

(65) Prior Publication Data
US 2015/0187174 A1    Jul. 2, 2015

(51) Int. Cl.
G06F 17/00    (2006.01)
G07F 17/32    (2006.01)
G06F 21/57    (2013.01)

(52) U.S. Cl.
CPC .......... G07F 17/3241 (2013.01); G06F 21/57 (2013.01); G06F 21/575 (2013.01)

(58) Field of Classification Search
CPC .................................................. G07F 17/3241
See application file for complete search history.

(56) References Cited

U.S. PATENT DOCUMENTS

| | | |
|---|---|---|
| 5,643,086 A | 7/1997 | Alcorn et al. |
| 5,800,264 A | 9/1998 | Pascal et al. |
| 6,106,396 A | 8/2000 | Alcorn et al. |
| 6,149,522 A | 11/2000 | Alcorn et al. |
| 6,287,202 B1 | 9/2001 | Pascal et al. |
| 6,620,047 B1 | 9/2003 | Alcorn et al. |
| 6,817,948 B2 | 11/2004 | Pascal et al. |
| 7,063,615 B2 | 6/2006 | Alcorn et al. |
| RE39,368 E | 10/2006 | Alcorn et al. |
| RE39,369 E | 10/2006 | Alcorn et al. |
| RE39,370 E | 10/2006 | Alcorn et al. |
| RE39,400 E * | 11/2006 | Alcorn ......................... 380/251 |
| RE39,401 E | 11/2006 | Alcorn et al. |
| 7,267,612 B2 | 9/2007 | Alcorn et al. |
| 7,278,031 B1 * | 10/2007 | Best ........................ A63F 13/10 713/191 |
| 8,784,195 B1 * | 7/2014 | Crowder, Jr. ......... H04L 9/3247 463/16 |
| 2002/0025852 A1 | 2/2002 | Alcorn et al. |
| 2002/0028707 A1 | 3/2002 | Pascal et al. |
| 2003/0195033 A1 * | 10/2003 | Gazdic ..................... A63F 13/00 463/20 |
| 2003/0203755 A1 * | 10/2003 | Jackson .............. G07F 17/3241 463/42 |

(Continued)

*Primary Examiner* — Dmitry Suhol
*Assistant Examiner* — Carl V Larsen
(74) *Attorney, Agent, or Firm* — Armstrong Teasdale LLP

(57) ABSTRACT

A computer-implemented method of authenticating a memory of a gaming machine is provided. The method uses a computing device having a processor communicatively coupled to a memory. The method includes identifying a first area of the memory including one or more operational data components associated with operating the gaming machine. The first area further includes a public key associated with an original memory area. The method also includes authenticating, by the processor, the first area using at least the public key from the first area.

12 Claims, 11 Drawing Sheets

(56) References Cited

U.S. PATENT DOCUMENTS

| | | | |
|---|---|---|---|
| 2004/0248646 A1* | 12/2004 | Canterbury | G06F 21/51 463/29 |
| 2004/0259643 A1* | 12/2004 | Gentles | G06F 21/575 463/43 |
| 2005/0009599 A1* | 1/2005 | Ryan | G06F 21/57 463/29 |
| 2005/0143171 A1* | 6/2005 | Loose | G06F 21/52 463/29 |
| 2010/0120527 A1* | 5/2010 | Singh | G07F 17/3241 463/29 |

* cited by examiner

_SYSTEM AND METHOD FOR AUTHENTICATING STORAGE MEDIA WITHIN AN ELECTRONIC GAMING SYSTEM_

BACKGROUND

The embodiments described herein relate generally to gaming machines and, more particularly, to systems and methods for use in authenticating gaming machines and the data storage areas contained therein.

At least some known gaming machines store data that is used during operation. For example, some known gaming machines store data such as an operating system, a gaming program, and/or game graphics that are used to present games to users. To facilitate more secure operation of casino gaming machines, some known gaming machines perform integrity checking of their stored data prior to operation. If the stored data does not pass an integrity check, then the machine does not progress into service (i.e., that machine is disabled until administrators can investigate and remedy the data breach).

To perform validity checking of a gaming machine's storage, examination of the machine's stored data may be necessary. However, as gaming machines increase in complexity and capability, it is sometimes necessary or advantageous to include storage capacity in excess of what is currently used or required by the device. An increase in total storage capacity may, however, lead to longer authentication times, and thus may keep a machine out of service for longer.

BRIEF DESCRIPTION

In one aspect, a computer-implemented method of authenticating a memory of a gaming machine is provided. The method uses a computing device having a processor communicatively coupled to a memory. The method includes identifying a first subset of the memory including one or more operational data components associated with operating the gaming machine. The method also includes identifying a second subset of the memory. At least some of the second subset of the memory is distinct from the first subset of the memory. The method further includes authenticating the first subset of the memory while the gaming machine is in a disabled state. The method also includes enabling operation of the gaming machine after said authenticating the first subset of the memory if the authentication of the first subset of the memory is successful. The method further includes authenticating the second subset of the memory while the gaming machine is in an enabled state.

In another aspect, a gaming machine is provided. The gaming machine includes a processor and a memory. The processor is programmed to identify a first subset of the memory including one or more operational data components associated with operating the gaming machine. The processor is also programmed to identify a second subset of the memory. At least some of the second subset of the memory is distinct from the first subset of the memory. The processor is further programmed to authenticate the first subset of the memory while the gaming machine is in a disabled state. The processor is also programmed to enable operation of said gaming machine after authenticating the first subset of the memory if the authentication of the first subset of the memory is successful. The processor is further programmed to authenticate the second subset of the memory while said gaming machine is in an enabled state.

In yet another aspect, one or more computer storage media embodying computer-executable instructions stored thereon for authenticating a memory of a gaming machine are provided. The instructions include the step of identifying a first subset of the memory including one or more operational data components associated with operating the gaming machine. The instructions also include the step of identifying a second subset of the memory. At least some of the second subset of the memory is distinct from the first subset of the memory. The instructions further include the step of authenticating the first subset of the memory while the gaming machine is in a disabled state. The instructions also include the step of enabling operation of the gaming machine after said authenticating the first subset of the memory if the authentication of the first subset of the memory is successful. The instructions further include the step of authenticating the second subset of the memory while the gaming machine is in an enabled state.

In yet another aspect, a computer-implemented method of authenticating a memory of a gaming machine is provided. The method uses a computing device having a processor communicatively coupled to a memory. The method includes identifying a first area of the memory including one or more operational data components associated with operating the gaming machine. The first area further includes a public key associated with an original memory area. The method also includes authenticating, by the processor, the first area using at least the public key from the first area.

In yet another aspect, a gaming machine is provided. The gaming machine includes a processor and a memory. The processor is programmed to identify a first area of the memory including one or more operational data components associated with operating the gaming machine. The first area further includes a public key associated with an original memory area. The processor is also programmed to authenticate the first area using at least the public key from the first area.

In yet another aspect, one or more computer storage media embodying computer-executable instructions stored thereon for authenticating a memory of a gaming machine are provided. The instructions include the step of identifying a first area of the memory including one or more operational data components associated with operating the gaming machine. The first area further includes a public key associated with an original memory area. The instructions also include the step of authenticating the first area using at least the public key from the first area.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Exemplary embodiments of systems and methods for use in authenticating storage media associated with a game of chance executed within an electronic gaming system are described herein. Such embodiments facilitate improved speed during authentication of a gaming system's data storage. The gaming machine includes a data storage area, such as a hard disk drive or a solid state drive, that is larger than is minimally necessary to hold all of the data required for operation, i.e., the data storage area contains unused space. The data storage is distinguished into two groups, or subsets, of data: a critical area and a non-critical area. The critical area contains data deemed of greater importance to the gaming system such as, for example, an operating system of the gaming system, executable instructions of the game of chance, graphics data, and/or other functional components that provide various known aspects of electronic games. The non-critical area is a memory area deemed of lesser importance to the gaming system such as, for example, empty or unused space. The critical area is authenticated, i.e., checked for integrity, prior to placing the gaming machine into service. If the authentication of the critical region is completed successfully, then the gaming machine is placed into service, i.e., users may start playing the game. Once the gaming machine is in service, the non-critical region is security scanned. Thus, this non-critical scan is processed while the gaming machine is in service. If the non-critical scan fails, the machine may be taken out of service, or otherwise flagged for analysis.

An exemplary technical effect of the methods, systems, and apparatus described herein includes at least one of: (a) performing authentication of a gaming device's memory, including at least integrity checking; (b) reducing processing time required for authenticating the gaming device's memory prior to start-up; (c) reducing out-of-service time for the gaming device; (d) performing authentication of a gaming device's unused memory; (e) segmenting the gaming device's memory into critical and non-critical regions with respect to authentication; (f) enabling gaming devices to have excess, unused storage built in without impacting processing time for authentication; and (g) authenticating one or more partitions of data without communication to an authority during the authentication process.

Figure 1:
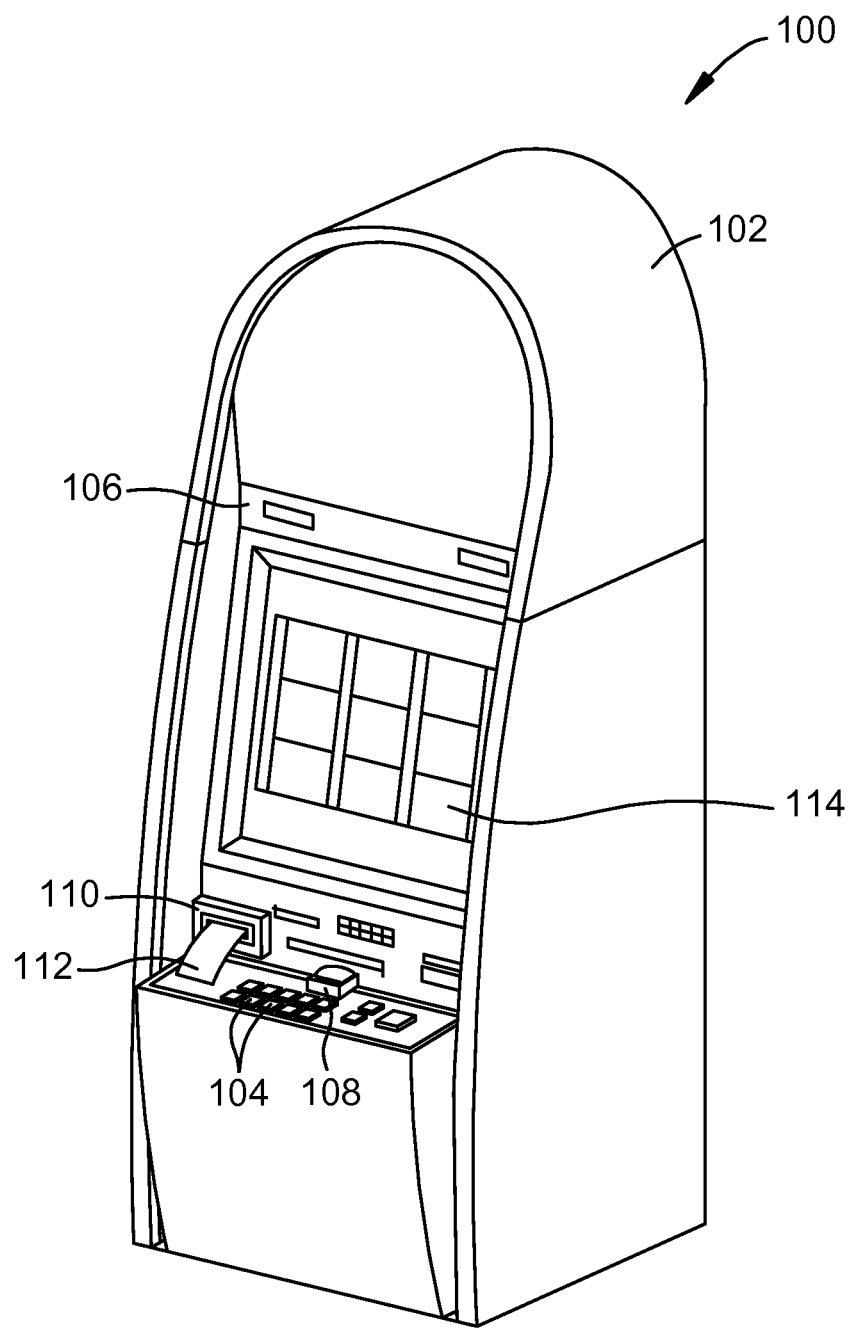
FIG. 1 is a schematic diagram of an exemplary gaming machine including data storage that is authenticated at start-up.

FIG. 1 is a schematic diagram of an exemplary gaming machine 100 including data storage that is authenticated at start-up. Gaming machine 100 may be any type of gaming machine, and may include, without limitation, different structures than those shown in FIG. 1. Moreover, gaming machine 100 may employ different methods of operation than those described below.

In the exemplary embodiment, gaming machine 100 includes a cabinet 102 configured to house a plurality of components, such as a gaming machine controller, peripheral devices, presentation devices, and player interaction devices. For example, in an exemplary embodiment, gaming machine 100 includes a plurality of input devices, such as switches and/or buttons 104 that are coupled to a front 106 of cabinet 102. Buttons 104 may be used to start play of a primary or secondary game. One button 104 may be a "Bet One" button that enables the player to place a bet or to increase a bet. Another button 104 may be a "Bet Max" button that enables the player to bet a maximum permitted wager. Yet another button 104 may be a "Cash Out" button that enables the player to receive a cash payment or other suitable form of payment, such as a ticket or voucher, which corresponds to a number of remaining credits.

In the exemplary embodiment, gaming machine 100 also includes a coin acceptor 108 for accepting coins and/or tokens, and a bill acceptor 110 for accepting and/or validating cash bills, coupons, and/or ticket vouchers 112. Bill acceptor 110 may also be capable of printing tickets 112. Furthermore, in some embodiments, bill acceptor 110 includes a card reader or validator for use with credit cards, debit cards, identification cards, and/or smart cards. The cards accepted by bill acceptor 110 may include a magnetic strip and/or a preprogrammed microchip that includes a player's identification, credit totals, and any other relevant information that may be used. Moreover, in the exemplary embodiment, gaming machine 100 includes one or more presentation devices 114. Presentation devices 114 are mounted to cabinet 102, and may include a primary presentation device for displaying a primary game and a secondary presentation device for displaying a secondary or bonus game. Presentation devices 114 may include, without limitation, a plasma display, a liquid crystal display (LCD), a display based on light emitting diodes (LEDs), organic light emitting diodes (OLEDs), polymer light emitting diodes (PLEDs), and/or surface-conduction electron emitters (SEDs), a speaker, an alarm, and/or any other device capable of presenting information to a user.

In an exemplary embodiment, presentation device 114 is used to display one or more game images, symbols, and/or indicia such as a visual representation or exhibition of movement of an object (e.g., a mechanical, virtual, or video reel), dynamic lighting, video images, and the like. In an alternative embodiment, presentation device 114 displays images and indicia using mechanical means. For example, presentation device 114 may include an electromechanical device, such as one or more rotatable reels, to display a plurality of game or other suitable images, symbols, or indicia.

In one embodiment, gaming machine 100 randomly generates game outcomes using probability data. For example, each game outcome is associated with one or more probability values that are used by gaming machine 100 to determine the game output to be displayed. Such a random calculation may be provided by a random number generator, such as a true random number generator (RNG), a pseudo-random number generator (PNG), or any other suitable randomization process.

Figure 2:
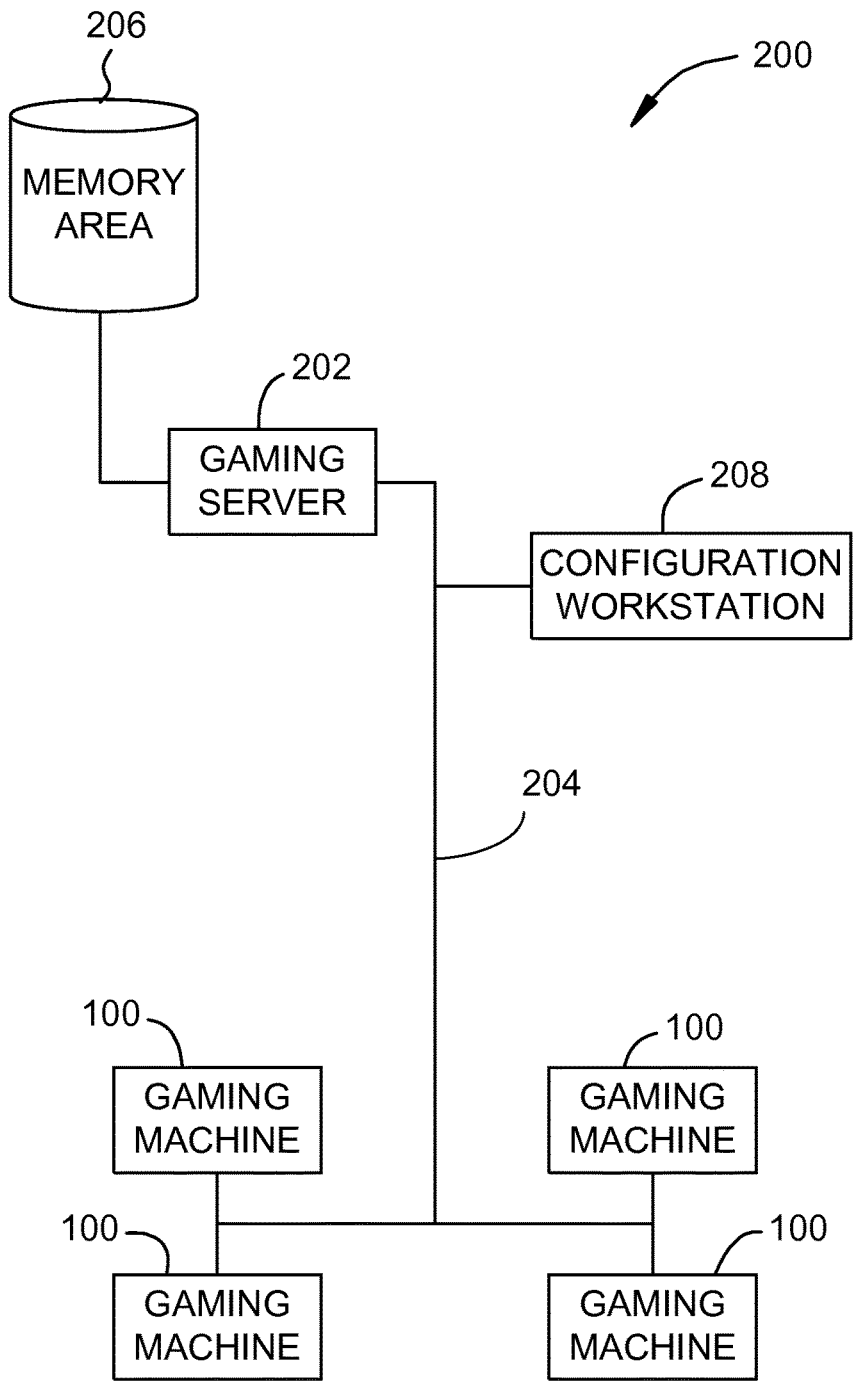
FIG. 2 is a block schematic diagram of an exemplary gaming system that includes a plurality of gaming machines, such as the gaming machine shown in FIG. 1.

FIG. 2 is a block schematic diagram of an exemplary gaming system 200 that includes a plurality of gaming machines, such as gaming machine 100 (shown in FIG. 1). Each gaming machine 100 is coupled via communication interface (not shown in FIG. 2) to one or more servers, such as a gaming server 202, using a network 204. Gaming server 202 includes a processor (not shown) that facilitates data communication between each gaming machine 100 and other components of gaming system 200. Such data is stored in, for example, a memory area 206, such as a database or a file system, which is coupled to gaming server 202.

In one embodiment, one or more gaming machines 100 may be remote gaming machines that access a casino over network 204. As such, a player is able to participate in a game of chance on a remote gaming machine while a player proxy is physically present at, for example, a casino or some other location. In this embodiment, it will be understood that a player operating a remote gaming machine has virtual access to any casino coupled to network 204 and associated with gaming server 202. Further, while gaming machines 100 are described herein as video bingo machines, video poker machines, video slot machines, and/or other similar gaming machines that implement alternative games, gaming machines 100 may also be a personal computers coupled to the Internet or to a virtual private network such that a player may participate in a game of chance remotely. In other embodiments, the player may use a cell phone or other web enabled devices coupled to a communication network to establish a connection with a particular casino. Moreover, gaming machines 100 may be terminal-based machines, wherein the actual games, including random number generation and/or outcome determination, are performed at gaming server 202. In such an embodiment, gaming machines 100 display results of a game via presentation device 114 (shown in FIG. 1).

In one embodiment, gaming server 202 performs a plurality of functions including, for example, game outcome generation, executing a game play event for a player, player proxy selection, player tracking functions, and/or accounting functions, and data authentication functions, to name a few. However, in alternative embodiments, gaming system 200 may include a plurality of servers that separately perform these functions and/or any suitable function for use in a network-based gaming system.

In some embodiments, gaming server 202 performs data authentication processes on memory area 206. As explained above, gaming server 202 distinguishes two subsets of memory area 206: a "critical region" and a "non-critical region" (not separately shown in FIG. 2). The critical region is authenticated prior to allowing gaming server 202 to enter service, i.e., allow game play. After the critical region authentication is successful, gaming server 202 enters service, and players may commence playing games. The non-critical region is then authenticated. If the non-critical region authentication fails, then corrective actions may be initiated, such as taking gaming server 202 out of service, or alerting gaming administrators as to the authentication failure. These authentication operations are described in greater detail below.

Figure 3:
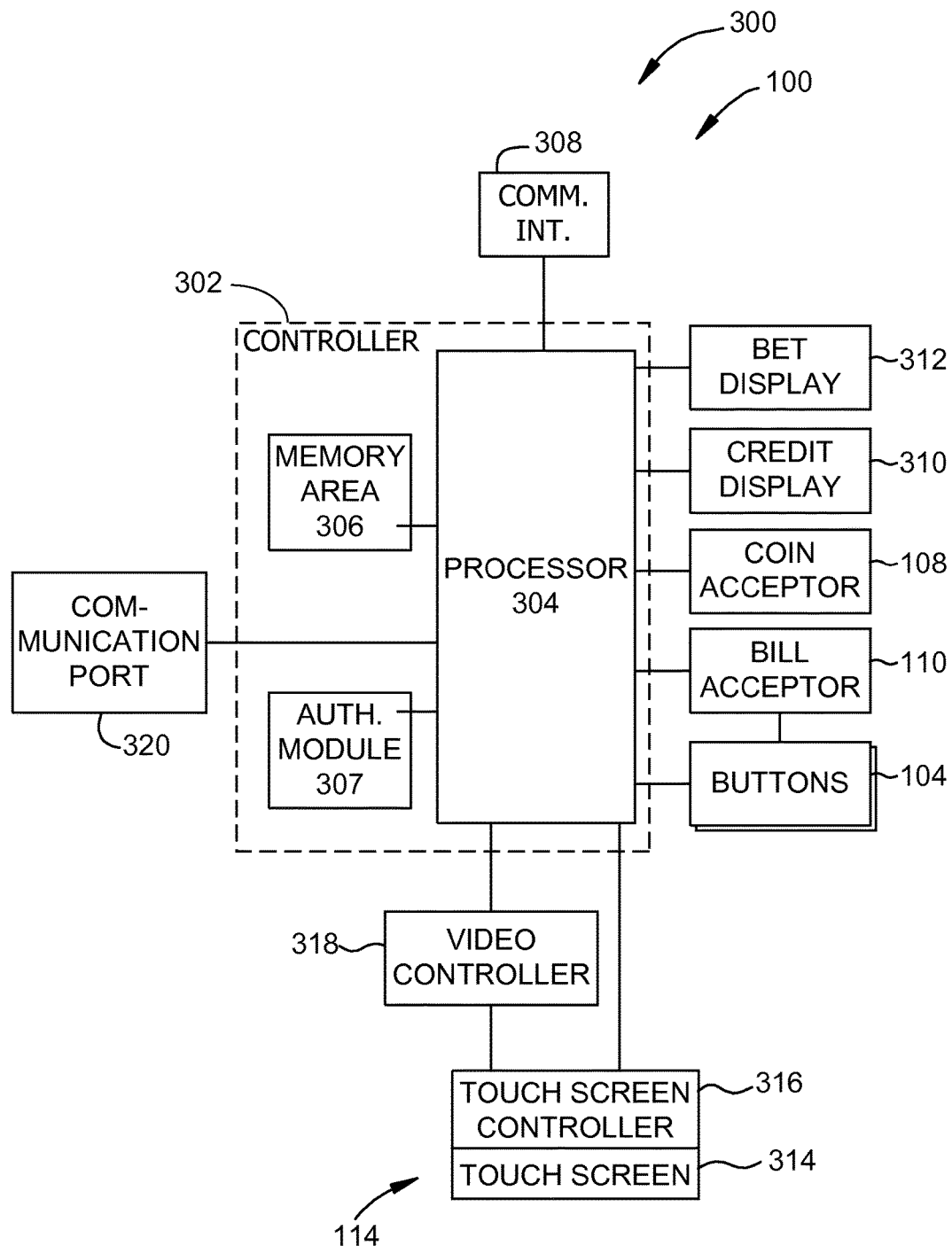
FIG. 3 is a schematic block diagram of an exemplary electrical architecture that may be used with the gaming machines shown in FIGS. 1 and 2.

FIG. 3 is a schematic block diagram of an exemplary electrical architecture 300 that may be used with gaming machine 100. In the exemplary embodiment, gaming machine 100 includes a gaming machine controller 302 including a processor 304 communicatively coupled to a memory area 306. Moreover, in the exemplary embodiment, processor 304 and memory area 306 reside within cabinet 102 (shown in FIG. 1), and may be collectively referred to herein as a "computer" or "controller." Gaming machine 100 is configurable and/or programmable to perform one or more operations described herein by programming processor 304. For example, processor 304 may be programmed by encoding an operation as one or more executable instructions and providing the executable instructions in memory area 306.

Controller 302 communicates with one or more other gaming machines 100, gaming servers 202 (shown in FIG. 2), or other suitable devices via a communication interface 308. Communication interface 308 may operate as an input device (e.g., by receiving data from another device) and/or as an output device (e.g., by transmitting data to another device). Processor 304 may be a microprocessor, a microcontroller-based platform, a suitable integrated circuit, and/or one or more application-specific integrated circuits (ASICs). However, the above examples are exemplary only, and thus are not intended to limit in any way the definition and/or meaning of the term "processor."

Memory area 306 stores at least program code and instructions, executable by processor 304, for controlling gaming machine 100. For example, memory area 306 stores data such as image data, event data, player input data, random or pseudo-random number generation software, pay table data, trigger event conditions, game play events, a list of predefined periods of time to execute the game play events, game play outcomes, data authentication functionality, and/or other information or applicable game rules that relate to game play on gaming machine 100. Moreover, memory area 306 may include one or more forms of memory. For example, memory area 306 can include random access memory (RAM), read-only memory (ROM), flash memory, and/or electrically erasable programmable read-only memory (EEPROM). In some embodiments, other suitable magnetic, optical, and/or semiconductor-based memory may be included in memory area 306 by itself or in combination. In one embodiment, the above data and program code and instructions, executable by processor 304 for authenticating data may be stored and executed from a memory area remote from computing device gaming machine 100. For example, the data and the computer-executable instructions may be stored in a cloud service, a database, or other memory area accessible by gaming machine 100. Such embodiments reduce the computational and storage burden on gaming machine 100. As such, memory area 306 may be a local and/or a remote computer storage media including memory storage devices.

In the exemplary embodiment, gaming machine 100 includes a credit display 310, which displays a player's current number of credits, cash, account balance or the equivalent. Gaming machine 100 also includes a bet display 312, which displays a player's amount wagered. Credit display 310 and bet display 312 may be standalone displays independent of presentation device 114, or credit display 310 and bet display 312 may be incorporated into presentation device 114.

Moreover, in an exemplary embodiment, presentation device 114 is controlled by controller 302. In some embodiments, presentation device 114 includes a touch screen 314 and an associated touch screen controller 316. In such embodiments, presentation device 114 may operate as an input device in addition to presenting information. A video controller 318 is communicatively coupled to controller 302 and touch screen controller 316 to enable a player to input game play decisions (e.g., actions) into gaming machine 100 via touch screen 314. Furthermore, gaming machine 100 includes one or more communication ports 320 that enable controller 302 to communicate with external peripheral devices (not shown) such as, but not limited to, external video sources, expansion buses, other displays, a SCSI port, or a key pad.

In some embodiments, controller 302 includes an authentication module 307. Authentication module 307 may include one or more keys associated with data authentication, such as, for example, public key encryption. Authentication module 307 may also include instructions and/or circuitry for authenticating storage, such as, for example, data comparison functionality, hashing functionality, and data encryption and decryption functionality. In some embodiments, authentication module 307 performs data authentication on data stored in memory area 206 (shown in FIG. 2) and/or memory area 306. In some embodiments, authentication module 307 includes read-only storage of one or more keys of one or more key pairs used during public key encryption and digital signature authentication of data associated with gaming machine 100.

Figure 4:
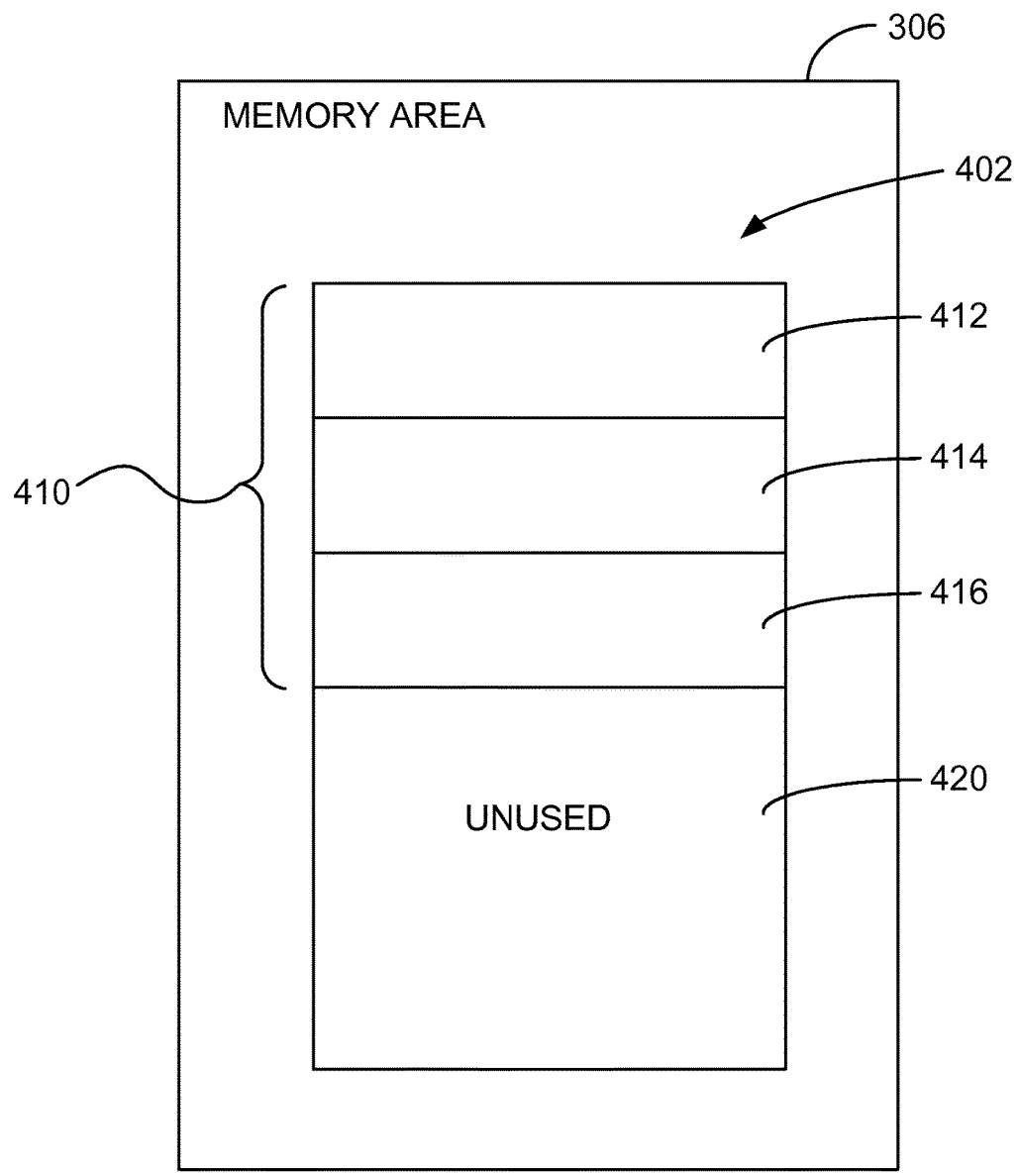
FIG. 4 is a diagram of memory area that may be used with the gaming machines shown in FIGS. 1 and 2, and with the electrical architecture shown in FIG. 3.

FIG. 4 is a diagram of memory area 306 that may be used with gaming machine 100 (shown in FIG. 1) and with electrical architecture 300 (shown in FIG. 3). In the exemplary embodiment, memory area 306 contains data 402 including at least program code and instructions, as mentioned above in reference to FIG. 3. In some embodiments, memory area 306 is a disk storage memory area such as, for example, a hard disk drive or solid state drive. In other embodiments, memory area 306 may be random access memory (RAM) or a read-only memory (ROM) memory area. Further, in the exemplary embodiment, data 402 is categorized into a plurality of categories. Data 402 includes a critical area 410 and a non-critical area 420. Critical area 410, in some embodiments, includes data such as an operating system 412 of gaming machine 100, gaming components and instructions 414, and gaming image data 416. In some embodiments, critical area 410 may include data such as, for example, computer code controlling general operation of gaming machine 100, interface with hardware devices such as, for example, ticket printers, bill acceptors, and lights, computer code controlling game state, game presentation, networking and communication, security, media such as sound, video, and images used to display game elements, data used to determine game outcomes, and data used to configure a machine's behavior in a network. Non-critical area 420, in the exemplary embodiment, includes empty storage space, i.e., no data. In some embodiments, non-critical area 420 may contain data. For example, data that may be deemed "less critical" to the security of gaming machine 100, such as any data whose authentication is deemed not necessary prior to placing gaming device 100 into service, may fall under non-critical area 420. In some embodiments, non-critical area 420 contains data that is not suggested or required to be authenticated, prior to enabling operations, by regulators and/or local, state, or federal regulations that govern lawful operation of gaming device 100.

In the exemplary embodiment, critical area 410 and/or non-critical area 420 are stored in an area of memory within a read/write type storage device such as a hard disk drive or a solid state memory device, and defines an orderable arrangement of memory that may be accessed sequentially. As described in greater detail below with respect to FIGS. 5-7, memory areas 410 or 420 may be accessed as single byte stream during data authentication, i.e., accessed starting from a first byte through to a final byte. In some embodiments, this access may be performed, for example, as an input/output (I/O) operation directly to the physical or logical device associated with the memory area, i.e., what is commonly described as "raw I/O" to the device. As such, the data of the memory area may be processed as a byte stream. In other embodiments, the byte stream may be formed by I/O operations through a logical volume manager associated with memory areas 410 and/or 420. For example, some known operating systems logically manage their underlying storage with a logical volume manager, and thus some I/O operations may be performed using logical devices that represent underlying logical or physical devices associated with memory areas.

For example, in some embodiments, critical area 410 and/or non-critical area 420 may be logical drives within one or more physical storage devices. As such, the data areas 410 and 420 may be distinguished based on their occupying different logical drives. In other embodiments, organization of memory area 306 may be controlled by a logical volume manager associated with the operating system of gaming machine 100. As such, data 402 may be represented as a set of data blocks within a logical volume or partition (not separately shown), and in which critical area 410 may be the formatted and allocated blocks of the logical volume, and non-critical area 420 may be the unformatted and/or unallocated blocks of the logical volume. Further, in some embodiments, a byte stream may be formed as all of the bytes within a logical volume. In other embodiments, the byte stream may be formed as all of the used/allocated bytes within a logical volume, or all of the unused/unallocated bytes within a logical volume. It should be understood, however, that any such physical storage device, logical structure of data, or physical placement of data on the physical or logical storage devices that facilitates the systems and methods described herein may be used.

Figure 5:
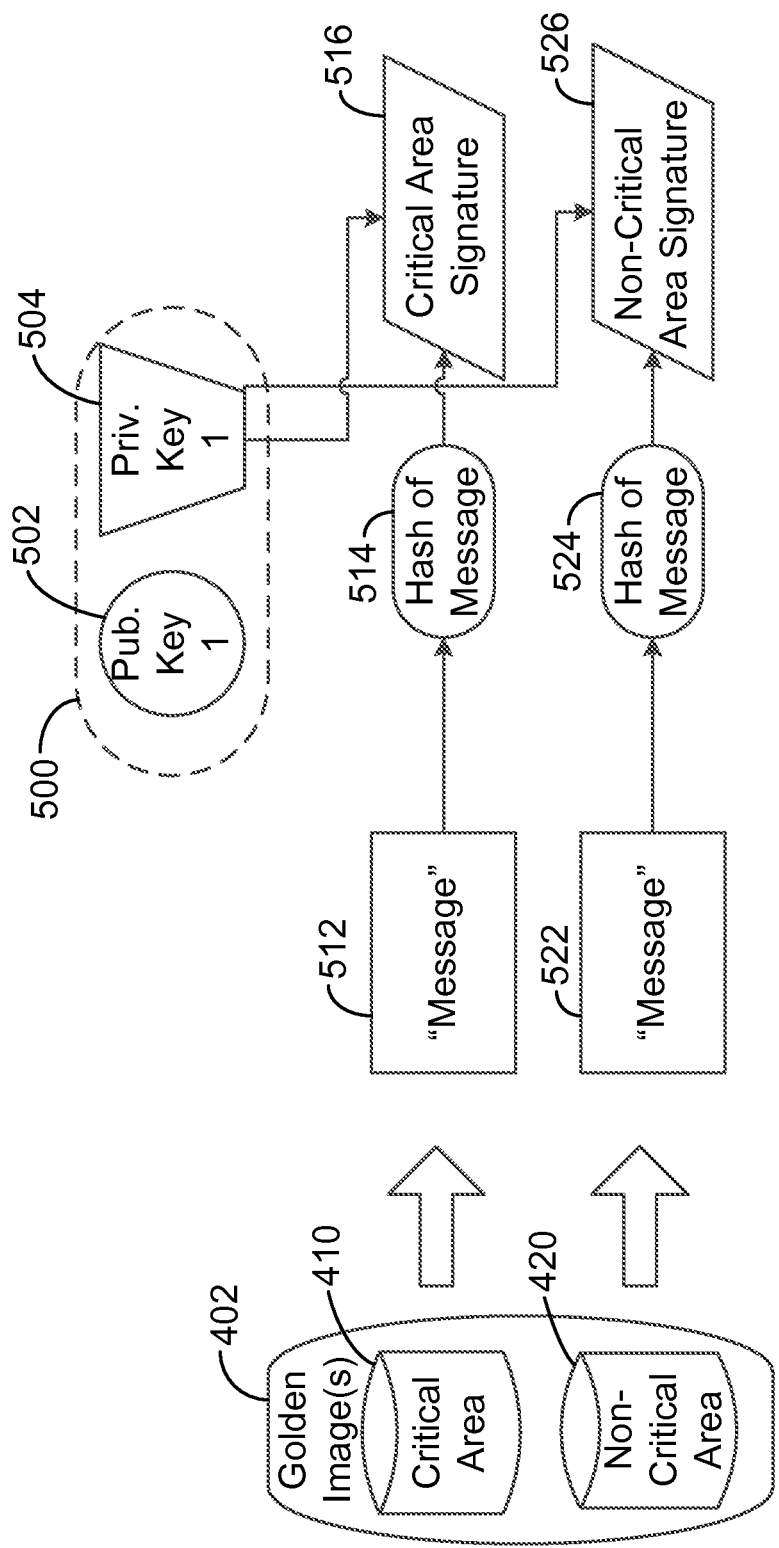
FIG. 5 is a flowchart of an exemplary process that may be implemented for authenticating storage media, such as the data shown in FIG. 4, within an electronic gaming machine, such as the gaming machine shown in FIG. 1.

FIG. 5 is a flowchart of an exemplary process that may be implemented for authenticating storage media, such as data 402 (shown in FIG. 4), within an electronic gaming machine (EGM), such as gaming machine 100 (shown in FIG. 1). In the exemplary embodiment, data 402 is authenticated using a digital signature process based on public key cryptography. More specifically, FIG. 5 illustrates an exemplary process for generating digital signatures associated with data 402 that are used during later authentication of gaming machine 100.

In some known digital signature methods based on public-key cryptography, a "signor" party has a "message," i.e., a segment of data, that he may desire to send to a "recipient." A digital signature is generated and transmitted along with the message, wherein the digital signature facilitates one or more aspects of authentication of the message such as, for example, ensuring integrity of the data that the recipient receives. As used herein, the term "original message" is used to refer to a segment of data that the signor transmits to the recipient, and the term "received message" is used to refer to the segment of data as received by the recipient. The received message is the data that is the subject of authentication. Generating a digital signature using public key cryptography, in some methods known in the art, includes generating a public/private key pair 500, i.e., a public key 502 and a private key 504. Additionally, generating a digital signature also includes identifying a "message", i.e., the original message for which the digital signature will be associated. A digital signature of this type may be directly associated with the particular message, i.e., the digital signature is custom-created to be associated with a particular message such that when a recipient receives the message and the signature, the signature must match the message in order to authenticate the signature. In some known systems, the original message is directly used to create the signature. In other known systems, the original message may first be "hashed", and the resultant hash value is used to create the digital signature. As used herein, the term "hash" is used broadly to refer to any algorithm that maps data of a variable length to data of a fixed length, and the term "original hash value" is used to refer to a hash value computed from the original message. To create this original hash value, a hash function is applied to the original message, and the hash function produces an output, i.e., a hash value, that is a (nearly and/or reliably) unique, fixed length "message digest" of the original message that can also be exactly recreated with exact the original message.

In the exemplary embodiment, a digital signature is generated for data 402 using key pair 500. More specifically, in the exemplary embodiment, a separate digital signature is generated for each of critical area 410 and non-critical area 420 using key pair 500, where critical area 410 and non-critical area 420 are treated as the "message" to be signed. In a first process, critical area 410 is used as message 512. A hash 514 is created from message 512 using a hash function known in the art. The resultant hash 514 acts as a fixed length message digest of the original message 512, i.e., critical area 410. This hash 514, also sometimes referred to herein as the "hash value" or "message digest," is then digitally signed using a public key cryptography algorithm known in the art in conjunction with private key 504 of key pair 500, thereby generating a digital signature associated with critical area 410, i.e., critical area signature 516. Critical area signature 516 is essentially an encryption of hash 514 using a private key of a public/private key pair. As such, decryption of signature 516 may be performed with public key 502, which would result in an unencrypted hash value, i.e., hash 514. In some embodiments, signature 516 may be created directly from message 512, i.e., without computing a hash 514. However, in some scenarios, this may generate a signature that is much larger than a signature created from a hash of the original message.

Similarly, in the exemplary embodiment, non-critical area 420 is also digitally signed. Non-critical area 420 is treated as message 522, and a hash value, hash 524, is created from message 522, i.e., non-critical area 420. This hash 524 is then digitally signed in conjunction with private key 504 to generate non-critical area signature 526. In some embodiments, non-critical area 420 may be defined with a specific pattern of values. For example, non-critical area 420 may be defined to contain all "0" bytes, or all "1" bytes, or a repeating, pre-defined set of byte values such as, for example, "10101010". In some embodiments, no digital signature is created for non-critical area 420.

While the exemplary embodiments are described as using a single public/private key pair, i.e., key pair 500, it should be understood that multiple public/private key pairs similar to key pair 500 may be generated, and each may be assigned and used with different areas of data 402. In other words, one key pair 500 may be used for critical area 410 and another key pair (not separately shown) may be used for non-critical area 420. Similarly, multiple hash functions and/or multiple public-key algorithms may be used to generate hashes 514, 524 and/or signatures 516, 526, respectively.

During operation, an operator or developer of electronic gaming machines 100 (shown in FIG. 1) creates a "golden image" of a particular gaming platform. The golden image 402 may contain, for example, an operating system image, various game executable programs for running the game during operations of gaming machine 100, and images that may be displayed during game play. The golden image is loaded onto gaming machine 100 to facilitate game play. As used herein, the term "loaded image" is used generally to refer to an image as it appears on gaming machine 100. In other words, after a copy of the golden image is loaded onto gaming machine 100, it becomes a "loaded image." Operators may desire to authenticate a loaded image, i.e., compare a particular loaded image to the golden image to ensure that the particular loaded image has not been altered or otherwise tampered with.

To facilitate this authentication, in the exemplary embodiment, operators identify a critical area 410 and a non-critical area 420 of the golden image 402. At least one key pair 500 is generated. Using key pair 500, digital signatures 516, 526 are created for each area as described above. One key of key pair 500, i.e., private key 504, is kept secure by the operator, i.e., not distributed to others, or to gaming machines 100. The other key of key pair 500, i.e., public key 502, is distributed to gaming machine 100 and stored therein. In some embodiments, public key 502 is stored within critical area 410. In other embodiments, public key 502 is stored within a ROM (not shown) or authentication module 307 (shown in FIG. 3). Additionally, each digital signature for the plurality of memory areas of the golden image are also distributed to and stored within gaming machine 100. In some embodiments, digital signatures 516 and/or 518 may be stored within gaming machine 100, such as, for example, within authentication module 308 or within a ROM. In other embodiments, digital signatures 516 and/or 518 may be transmitted across a network such as network 204 from a server such as configuration workstation 208 to gaming server 202 for use during authentication. Further, a copy of the golden image, i.e., the data in data 402, also referred to as the load image, is loaded onto gaming machine 100. The authentication of the load image (not shown in FIG. 5) is described below in reference to FIG. 6.

Figure 6:
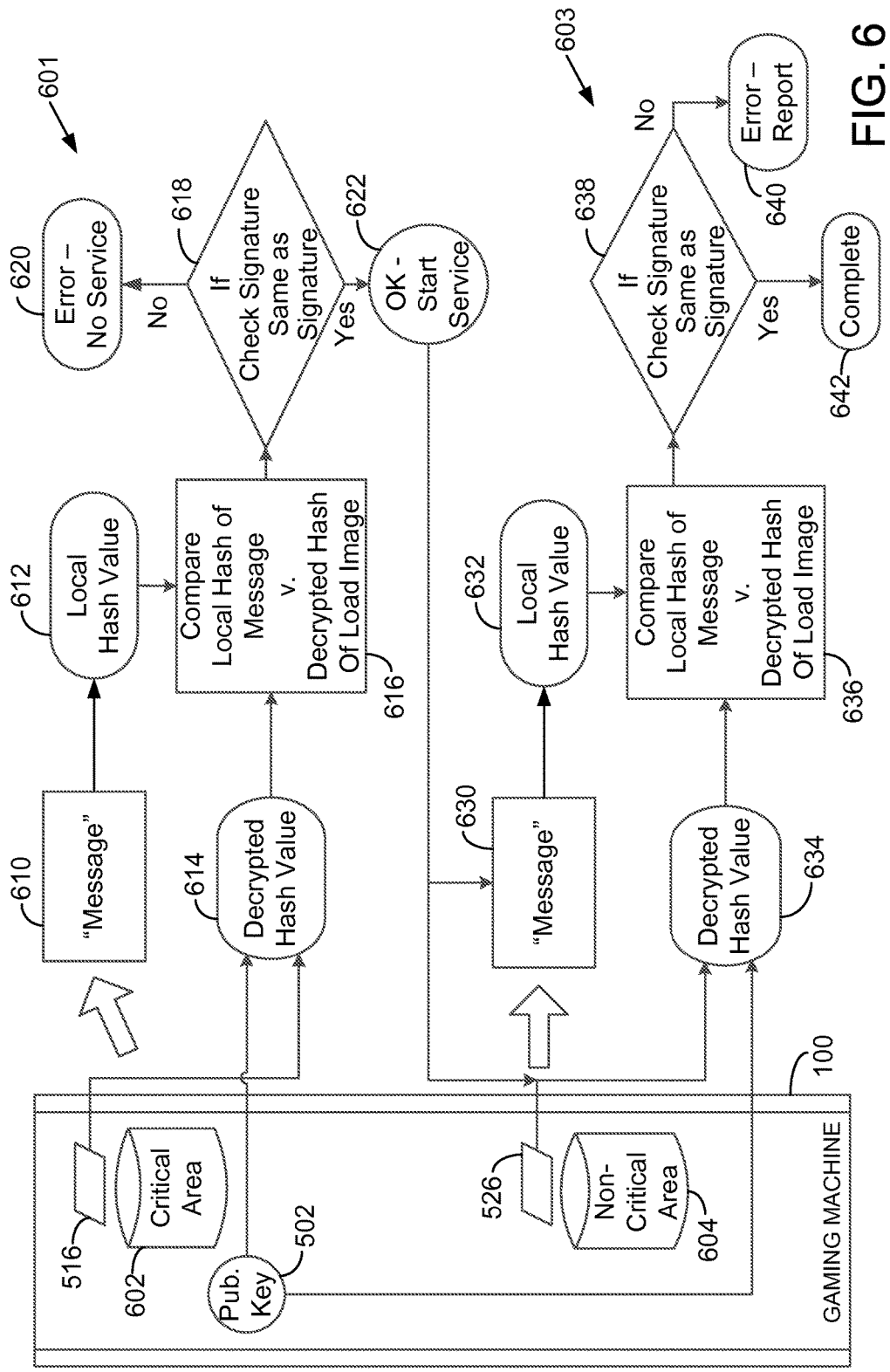
FIG. 6 is a flowchart of an exemplary process for authenticating storage media, such as the data shown in FIG. 4, within an electronic gaming machine, such as the gaming machine shown in FIG. 1.

FIG. 6 is a flowchart of an exemplary process for authenticating storage media, such as critical area 602 and non-critical area 604, against original images such as golden image 402 (shown in FIG. 4), within an EGM such as gaming machine 100 (shown in FIG. 1). More specifically, FIG. 6 illustrates an exemplary process for analyzing digital signatures associated with data 402 to ensure that, for example, critical area 410 and non-critical area 420 have not been altered as compared with golden image 402 (shown in FIG. 5).

In the exemplary embodiment, gaming machine 100 performs critical authentication 601 prior to enabling operation, and subsequently performs non-critical authentication 603. More specifically, gaming machine 100 has an internal storage pool such as a hard disk drive. The storage pool includes at least one segment of memory, or area of memory, that stores critical data, i.e., critical area 602. The remainder of the storage pool may be empty, or otherwise contain non-critical data, i.e., non-critical area 604. As described below, critical area 602 and non-critical area 604 are desired to be integrity-verified, i.e., authenticated, with golden image 402 using digital signatures generated against critical area 410 and non-critical area 420.

In some known digital signature methods based on public-key cryptography, the recipient has the public key of the signor, and receives a message, i.e., the received message, and a digital signature from the signor. The recipient decrypts the signature using a public key from the signor, thereby generating a decrypted hash value. As used herein, the term "decrypted signature" and "decrypted hash value" are used to refer to this resulting hash value. If the signature was made from a hash of the original message, as described above, then the decryption of the signature should result in recreation of the original hash value. To authenticate the digital signature, i.e., the decrypted hash, the recipient creates a local hash value of the received message using the same hashing function used by the signor. As used herein, the term "local hash value" refers to the hash value created by the recipient hashing the received message. If the signature is authentic, then the local hash value should match the decrypted hash.

In the exemplary embodiment, gaming machine 100 has a load image stored within, i.e., a working copy of golden image 402. The load image includes a critical area 602 and a non-critical area 604. Gaming machine 100 also includes public key 502, i.e., the public key of the signor as described in reference to FIG. 5. Further, gaming machine 100 includes digital signatures 516 and 526, i.e., the digital signatures of the golden image critical area 410 and non-critical area 420 (both shown in FIG. 5). During critical authentication 601, gaming machine 100 is out of service, i.e., in a disabled state, such as during an initialization process conducted during start-up. Gaming machine 100 executes an authentication process to, for example, verify the integrity of its load image, i.e., critical area 602 and non-critical area 604.

In the exemplary embodiment, critical area 602 is used as a message 610, i.e., the received message. Message 610 is hashed using the same hash function used by the signor, resulting in a local hash value 612. Further, signature 516 is decrypted using public key 502, i.e., the public key of the signor, and using the same public key cryptography algorithm used by the signor. The decryption of signature 516 generates a decrypted hash value 614. Gaming machine 100 then compares 616 local hash value 612 to decrypted hash value 614. If 618 the values do not match, then gaming machine 100 conducts 620 error operations such as, for example, reporting a fatal error and not entering service. If 618 the values match, then gaming machine 100 enters service 622. The term "entering service" is used generally to refer to the starting of gaming functions, such as, for example, the running of gaming programs such that users of gaming machine 100 may play electronic games. Entering service may also be referred to as transitioning from a disabled state to an enabled state, wherein the state refers to whether or not gaming machine 100 may allow users to play and/or whether or not gaming machine 100 is available to accept wagers. In a disabled state, gaming machine 100 would not be able to accept wagers, where in an enabled state, gaming machine 100 would be able to accept wagers.

In the exemplary embodiment, after gaming machine 100 is placed into service, i.e., changed to an enabled state, non-critical area 604 is authenticated 603. Authentication of non-critical area 604 may be performed while gaming machine 100 is conducting gaming operations, i.e., while players are making wagers. Non-critical area 604 is used as message 630, i.e., the received message. Message 630 is hashed using the same hash function used by the signor, resulting in a local hash value 632. In the exemplary embodiment, signature 526 is decrypted using public key 502, i.e., the public key of the signor, and using the same public key cryptography algorithm used by the signor. The decryption of signature 526 generates a decrypted hash value 634. Gaming machine 100 then compares 636 local hash value 632 to decrypted hash value 634. If 638 the values do not match, then gaming machine 100 conducts 620 error operations such as, for example, reporting a fatal error and terminating service, i.e., shutting down, or non-terminal error operations such as reporting to operators that there is an image error. If 642 the values match, then gaming machine 100 has successfully completed authentication of the load image.

In some embodiments, after gaming machine 100 is placed into service, non-critical area is authenticated through other data authentication operations such as, for example, checking non-critical area for an expected byte value, or an expected repeating pattern of values. For example, non-critical area 604 may be checked to contain all "0" value bytes, or all "1" value bytes, or some pre-defined, repeating pattern such as "10101010". In other embodiments, a checksum may be generated for non-critical area 604, and may be compared against a pre-computed value such as, for example, a checksum value generated against non-critical area 420 (shown in FIG. 5).

In some embodiments, the signor party may be the same party as the recipient party. In other words, the functions of digital signatures using public key cryptography as described above may be provided by different actors within the same entity. For example, a casino operator may create the public/private key pair 500 (shown in FIG. 5) and create the original message and digital signatures as the "signor", but may also act as the "recipient" through the decryption of the signatures and analysis of the load image within gaming machine 100. In another example, another party such as a game machine manufacturer or a game programmer may create the original message and digital signatures, and the casino operator, i.e., the gaming machine 100, may act as the recipient. In either single-party or multi-party scenarios, the function of the digital signatures as described herein is at least to verify that the load images, i.e., critical area 602 and non-critical area 604, are unchanged as compared to golden images 402. Security is improved by keeping one of the two keys of key pair 500 private, i.e., private key 504 (shown in FIG. 5).

It should be understood that, while the above embodiments describe digitally signing two memory areas, i.e., critical area 410 and non-critical area 420 (both shown in FIG. 5), more than two memory areas may be authenticated using the systems and methods described herein. For example, there may be a plurality of critical areas 410 that are digitally signed and a plurality of load image critical areas 602 that are authenticated with those signatures prior to enabling operation of gaming machine 100. For another example, there may be a plurality of non-critical areas 420 that are digitally signed and a plurality of load image non-critical areas 604 that are authenticated with those signatures after enabling operation of gaming machine 100. As such, authentication of one or more critical areas 602 represents a pre-service authentication, and authentication of one or more non-critical areas 604 represents a post-enablement authentication.

Figure 7:
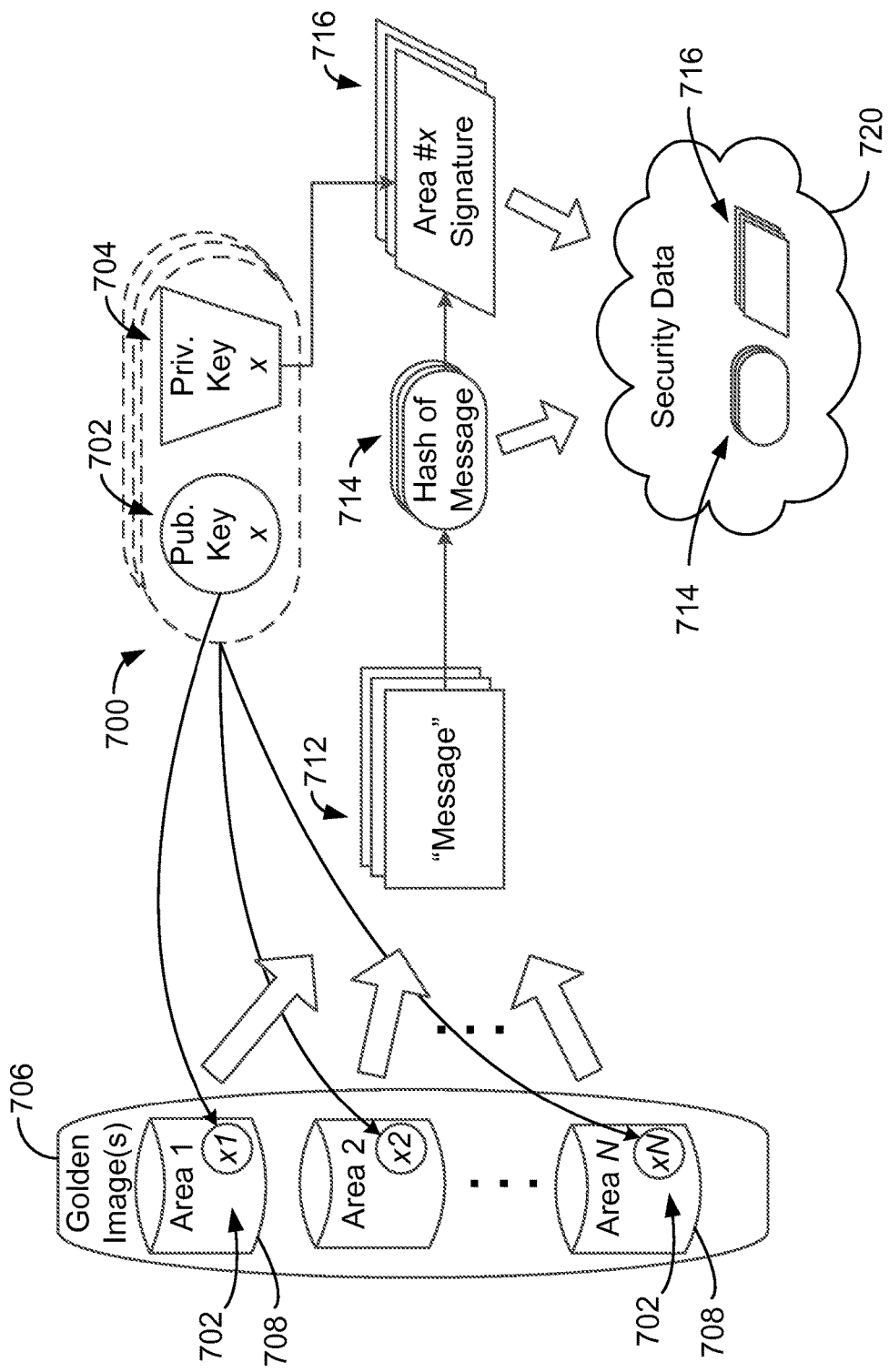
FIG. 7 is a flowchart of an exemplary process for authenticating storage media, such as golden image shown in FIG. 4, within an EGM such as the gaming machine shown in FIG. 1.

FIG. 7 is a flowchart of an exemplary process for authenticating storage media, such as golden image 402 (shown in FIG. 4), within an EGM, such as gaming machine 100 (shown in FIG. 1). More specifically, FIG. 7 illustrates an exemplary process for authenticating multiple data partitions associated with data 402 to ensure that partitions within an EGM have not been altered as compared with a golden image of the original data, such as golden images 706. In some embodiments, golden images 706 are similar to golden images 402.

In the exemplary embodiment, one or more key pairs 700 are generated as described above in reference to FIG. 5. Each key pair includes a public key 702 and a private key 704. In some embodiments, golden image data 706 may be partitioned into multiple partitions, such as areas 708. Each area 708 is associated with a key pair 700. In some embodiments, each area 708 is associated with its own key pair 700. In other embodiments, multiple areas 708 may share key pairs 700. In the exemplary embodiment, each area 708 has its associated public key 702 for the associated key pair 700 stored within area 708 prior to creating a digital signature for the area. As such, public key 702 is included as a part of the hashing and digital signature of the area, as described below.

In the exemplary embodiment, one or more areas 708 are construed as messages 712 and digitally signed. In some embodiments, each message 712 is processed similarly to messages 512, 522 as shown and described in reference to FIG. 5. In the exemplary embodiment, message 712 is hashed to create a hash 714. A digital signature 716 is created using private key 704 from the associated key pair 700 for message 712. Both hash 714 and digital signature 716 are stored as a part of security data 720, whose uses are described below in reference to FIG. 8.

Figure 8:
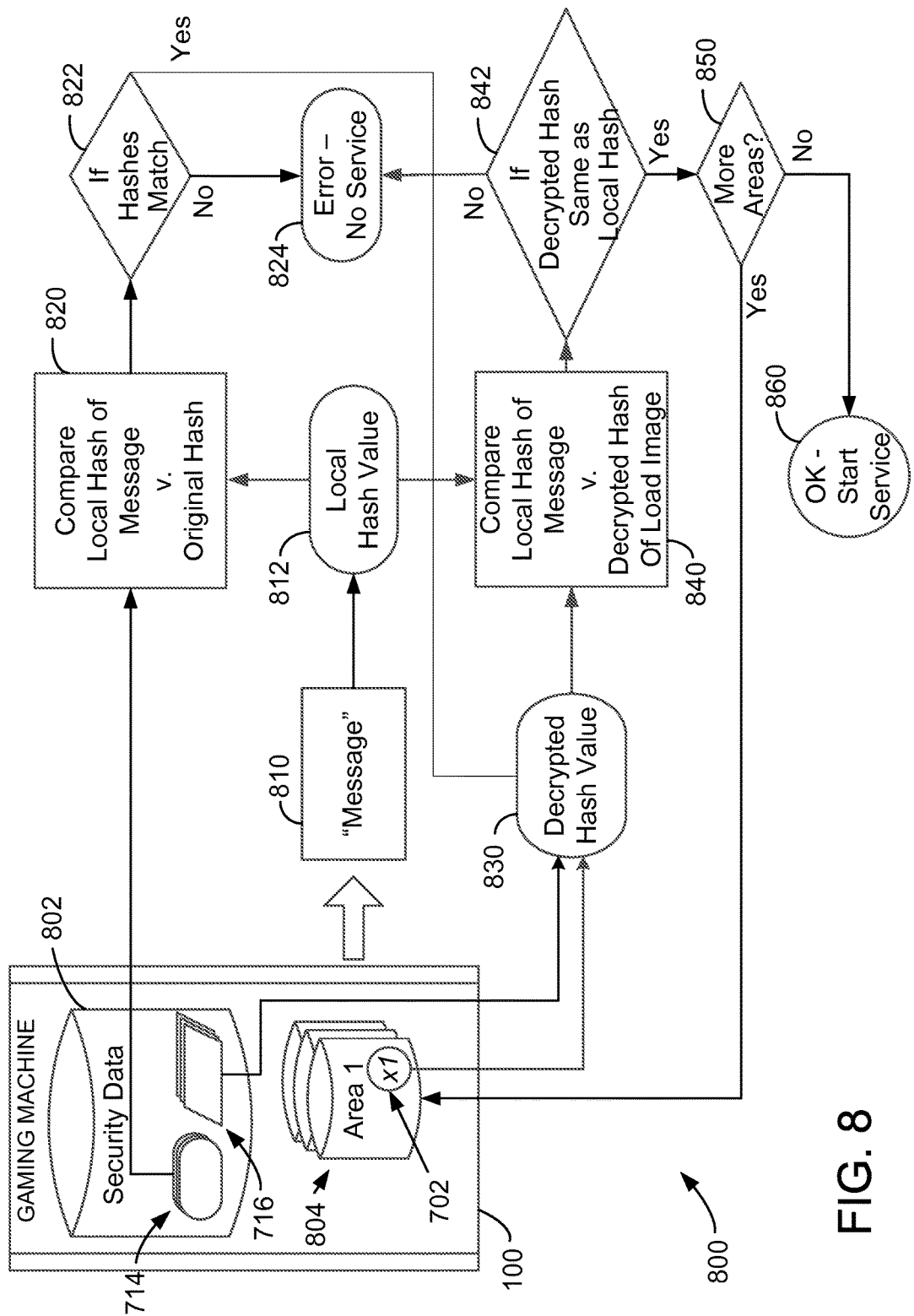
FIG. 8 is a flowchart of an exemplary process for authenticating storage media against original images such as the golden images shown in FIG. 7 within an EGM such as the gaming machine shown in FIG. 1.

FIG. 8 is a flowchart of an exemplary process 800 for authenticating storage media, such as areas 804, against original images such as golden images 706 (shown in FIG. 7), within an EGM such as gaming machine 100. More specifically, FIG. 8 illustrates an exemplary process 800 for analyzing digital signatures associated with one or more areas 708 to ensure that, for example, areas 804 within EGM 100 have not been altered as compared with original areas 708.

In the exemplary embodiment, gaming machine 100 performs authentication of areas 804 prior to enabling operation. In some embodiments, gaming machine 100 performs authentication of some areas 804 prior to enabling operation, and subsequently performs authentication of other areas 804 after enabling operation, as described above in reference to FIG. 6. In the exemplary embodiment, gaming machine 100 has an internal storage pool such as a hard disk drive. The storage pool includes at least one or more segments or partitions of memory that stores data that may be authenticated, such as areas 804. Each area 804 also includes within it one or more public keys 702. Further, gaming machine 100 also includes security data 802 memory area that includes at least hashes 714 and digital signatures 716 generated as described above in reference to FIG. 7.

During operation, in the exemplary embodiment, each of areas 804 are individually processed, i.e., authenticated. Area 804 is used as message 810, and a local hash value 812 is computed similar to the processes described above. Local hash value 812 acts as a message digest of an individual area 804. Local hash value 812 is compared 820 against the original hash value 714 stored within security data 802. If 822 the hashes do not match, then an error 824 is generated. In some embodiments, generation of error 824 may render gaming machine 100 out of service, i.e., inoperable for player wagering purposes.

Further, in the exemplary embodiment, digital signature 716 associated with area 804 is decrypted using the associated public key 702 stored within area 804 to generate a decrypted hash value 830. Decrypted hash value 830 is compared 840 to local hash value 812. If 842 decrypted hash value 830 does not match local hash value 812, an error 824 is generated as described above. Otherwise, if 842 hash values do match, then more areas 850 may be similarly processed. In the exemplary embodiment, once all areas 804 have been successfully authenticated, then gaming machine 100 may start service 860.

Further, in some embodiments, comparing 820 the local hash value 812 to the original hash value 714 may be performed prior to comparing 840 the local hash value 812 to the decrypted hash value 830. Gaming machine 100 may be started after comparing 820 but prior to comparing 840. As such, comparing 820 may provide a faster integrity check prior to boot up of gaming machine 100, or a more timely detection of a discrepancy. The inclusion of public key 702 within area 708 and 804 enables an additional integrity verification of public key 702 during comparing 820, as well as a stand-alone authentication process without need for network connectivity to receive data from a central server.

Figure 9:
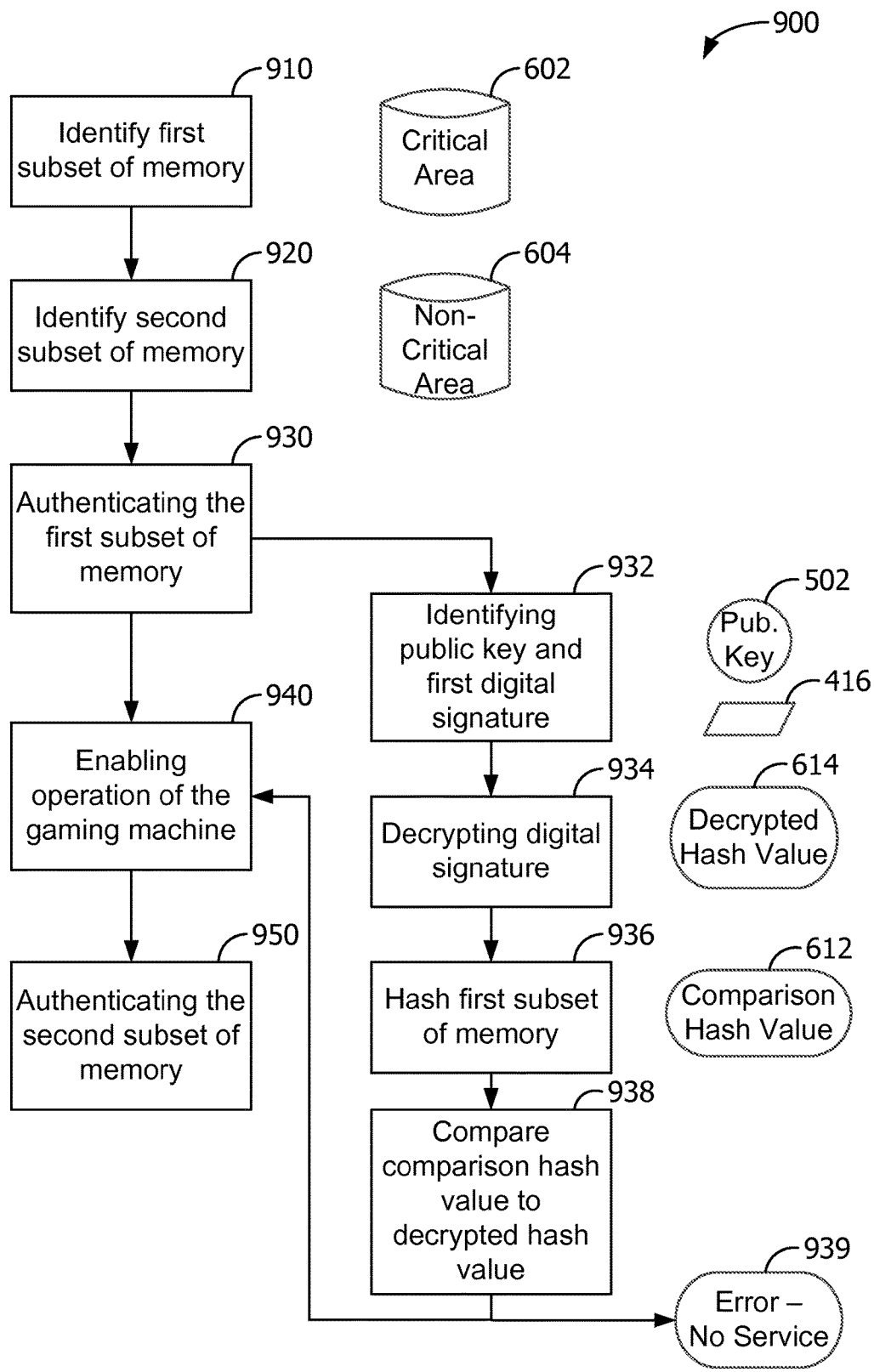
FIG. 9 is a flowchart of an exemplary method of enabling authentication of storage media, such as the data shown in FIG. 4, within an electronic gaming machine such as the gaming machine shown in FIG. 1.

FIG. 9 is a flowchart of an exemplary method 900 of enabling authentication of storage media within an electronic gaming machine. Operations in method 900 may be performed by one or more gaming machines 100, by gaming server 202 (shown in FIG. 2), and/or by any other computing device or combination thereof. In exemplary embodiments, and referring to FIGS. 5 and 6, method 900 includes identifying 910 a first subset of the memory (e.g., critical area 602, shown in FIG. 6) including one or more operational data components associated with operating the gaming machine (e.g., one of gaming machines 100). In some embodiments, identifying 910 a first subset of the memory includes identifying a first subset of the memory including one or more of an operating system of gaming machine 100, a gaming program, and graphics data associated with the gaming program. Method 900 also includes identifying 920 a second subset of the memory (e.g., non-critical area 604, shown in FIG. 6). In some embodiments, identifying 920 a second subset of the memory includes identifying a second subset of the memory including an unused segment of memory not included in the first subset of the memory.

In the exemplary embodiment, method 900 further includes authenticating 930 the first subset of the memory while gaming machine 100 is in a disabled state (e.g., during power-up). In some embodiments, authenticating 930 the first subset of the memory includes authenticating 930 the first subset of the memory using a first digital signature created using public key encryption. More specifically, in some embodiments, authenticating 930 the first subset of the memory includes identifying 932 a public key 502 and a first digital signature 516 associated with the public key 502 and a first original message (e.g., critical area 410, shown in FIG. 5), decrypting 934 the first digital signature 516 using at least the public key 502, thereby generating a decrypted hash value 614, hashing 936 the first subset of the memory, thereby generating a local hash value 612, and comparing 938 the local hash value 612 to the decrypted hash value 614, thereby defining the success of the authentication 930 of the first subset of the memory.

Further, in the exemplary embodiment, method 900 includes enabling 940 operation of the gaming machine (e.g., allowing game play to start) after authenticating 930 the first subset of the memory if authenticating 930 the first subset of the memory is successful (i.e., if the first signature matches the critical load image). Method 900 also includes authenticating 950 the second subset of the memory while gaming machine 100 is in an enabled state. In some embodiments, authenticating 950 the second subset of the memory includes authenticating the second subset of the memory using a second digital signature created using public key encryption (e.g., digital signature 526, shown in FIG. 5). In some embodiments, method 900 includes disabling operation of gaming machine 100 if authenticating 950 the second subset of the memory fails (i.e., if the second signature does not match the non-critical load image).

Figure 10:
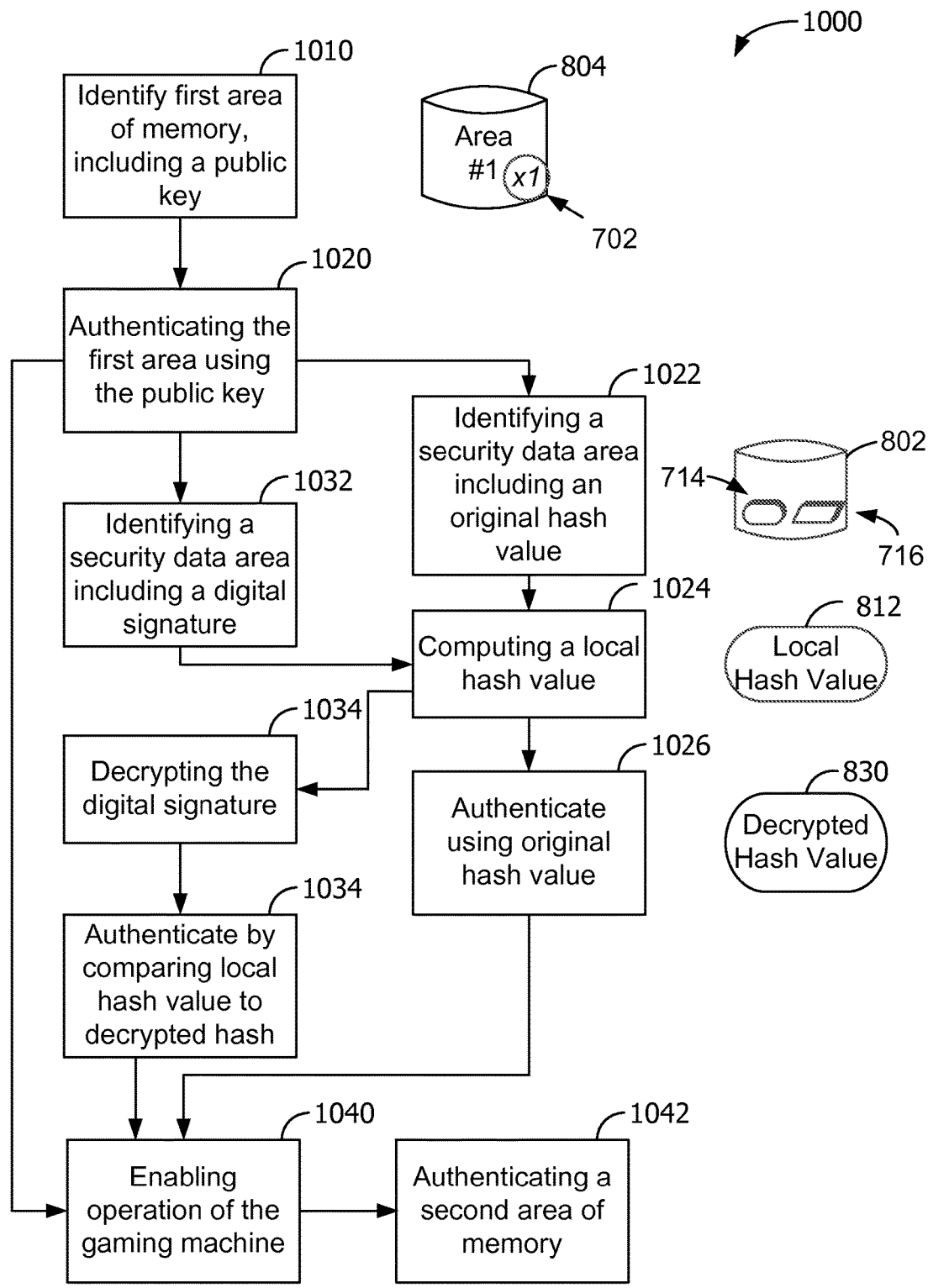
FIG. 10 is a flowchart of an exemplary method of enabling authentication of storage media within an electronic gaming machine.

FIG. 10 is a flowchart of an exemplary method 1000 of enabling authentication of storage media within an electronic gaming machine. Operations in method 1000 may be performed by one or more gaming machines 100, by gaming server 202 (shown in FIG. 2), and/or by any other computing device or combination thereof. In exemplary embodiments, and referring to FIGS. 7 and 8, method 1000 includes identifying 1010 a first area 804 of the memory including one or more operational data components associated with operating the gaming machine 100. First area 804 further includes a public key 702 associated with an original memory area, such as area 708 (shown in FIG. 7). Method 1000 also includes authenticating, by the processor, first area 804 using at least public key 702 from the first area 804.

In some embodiments, method 1000 includes identifying 1022 a security data area 802 including an original hash value 714, and computing 1024 a hash value of the first area to generate a local hash value 812, wherein authenticating the first area further includes comparing 1026 the original hash value 714 to the local hash value 812. In other embodiments, method 1000 includes identifying 1032 a security data area 802 including a digital signature 716, decrypting 1034 the digital signature 716 using at least the public key 702, thereby generating a decrypted hash value 830, computing 1024 a hash value of the first area to generate a local hash value 812, wherein authenticating 1020 the first area further includes comparing 1034 the decrypted hash value 830 to the local hash value 812. Further, in some embodiments, authenticating 1020 the first area 804 further includes authenticating the first area using public key encryption. Also, in some embodiments, method 1000 includes enabling game play operation of the gaming machine upon successful authentication of the first area.

Further, in some embodiments, method 1000 includes identifying a plurality of areas of the memory and authenticating each of the plurality of areas using one or more public keys. In other embodiments, method 1000 includes identifying a second area of the memory, wherein at least some of the second subset of the memory is distinct from the first area, authenticating the first area while the gaming machine is in a disabled state, enabling operation of the gaming machine upon successful authentication of the first area, and authenticating the second area while the gaming machine is in an enabled state.

Figure 11:
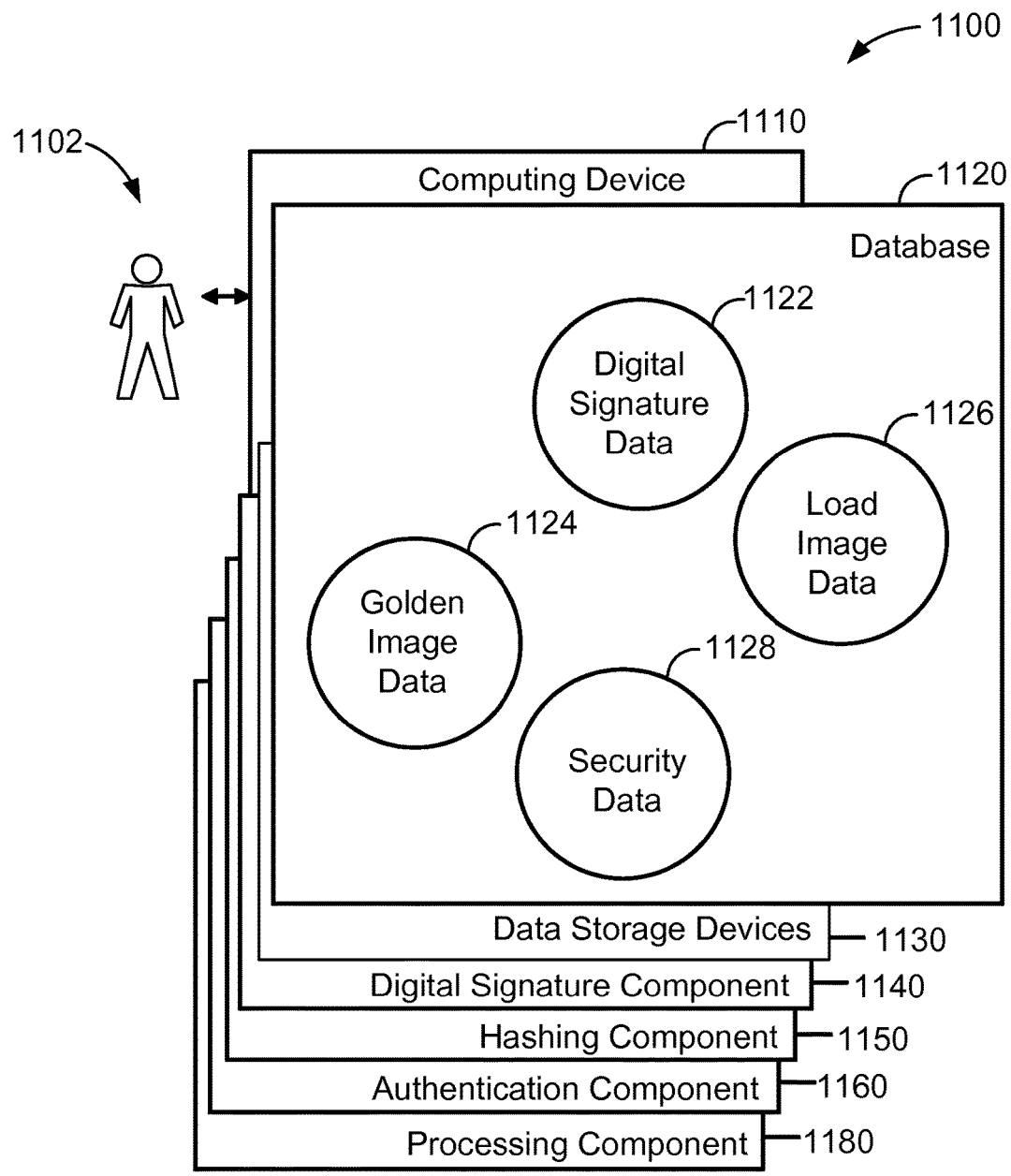
FIG. 11 shows an exemplary configuration of a database in communication with the electronic gaming machine shown in FIG. 1.

FIG. 11 shows an exemplary configuration 1100 of a database 1120 within a computing device 1110, along with other related computing components, that may be used to authenticate storage media within electronic gaming machines. In some embodiments, computing device 1110 is similar to gaming machine 100 (shown in FIG. 1). Database 1120 may be coupled to several separate components within computing device 1110, which perform specific tasks.

In the example embodiment, database 1120 includes digital signature data 1122, golden image data 1124, load image data 1126, and security data 1128. In some embodiments, database 1120 is similar to memory area 306 (shown in FIG. 3). Golden image data 1124 includes data such as critical area 410 and non-critical area 420 (shown in FIG. 5). Load image data 1126 includes data such as critical area 602 and non-critical area 604 (shown in FIG. 5). Digital signature data 1122 includes information associated with creating and/or authenticating digital signatures using one or more of golden image data 1124 and load image data 1126. Security data 1128 includes data such as hash values and digital signatures used for authenticating data partitions such as areas 804 (shown in FIG. 8).

Computing device 1110 includes the database 1120, as well as data storage devices 1130. Computing device 1110 also includes a digital signature component 1140 for creating and/or authenticating digital signatures, such as signatures 516 and 526 (shown in FIG. 5). Computing device 1110 also includes a hashing component 1150 for hashing messages such as messages 512, 522 (shown in FIG. 5), 610, and 630 (shown in FIG. 6). An authentication component 1160 is also included for performing steps associated with authentication of load image data 1126. In some embodiments, authentication component 1160 is similar to authentication module 307 (shown in FIG. 3). A processing component 1180 assists with execution of computer-executable instructions associated with the authentication system.

The above-described systems and methods provide a way to allow an expansion of internal storage, i.e., memory, into a gaming machine without increasing processing time required for authentication of the extra, unused space. Segmenting the internal storage into critical and non-critical regions allows the gaming device to authenticate the critical aspects of the gaming machine's storage prior to the machine entering service, and to then authenticate the non-critical aspects of storage after the machine has entered service. In other words, processing time for authentication of unused or non-critical storage space is deferred until after the machine has entered service, thereby enabling the gaming machine to get into service in a shorter period of time.

The systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer, controller, or server, such as those described herein, includes at least one processor or processing unit and a system memory. The computer, controller, or server typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present disclosure is described in connection with an exemplary gaming system environment, embodiments of the present disclosure are operational with numerous other general purpose or special purpose gaming system environments or configurations. The gaming system environment is not intended to suggest any limitation as to the scope of use or functionality of any aspect of the disclosure. Moreover, the gaming system environment should not be interpreted as having any dependency or requirement relating to any one or combination of components illustrated in the exemplary operating environment.

Embodiments of the present disclosure may be described in the general context of computer-executable instructions, such as program components or modules, executed by one or more computers or other devices. Aspects of the present disclosure may be implemented with any number and organization of components or modules. For example, aspects of the present disclosure are not limited to the specific computer-executable instructions or the specific components or modules illustrated in the figures and described herein. Alternative embodiments of the present disclosure may include different computer-executable instructions or components having more or less functionality than illustrated and described herein.

The order of execution or performance of the operations in the embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

In some embodiments, the term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, PostgreSQL, and SQLite. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

When introducing elements of aspects of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements.

The present disclosure uses examples to disclose the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method of authenticating a memory of a gaming machine, said method using a computing device having a processor communicatively coupled to a memory, said method comprising:
   identifying a first area of the memory including one or more operational data components associated with operating the gaming machine;
   retrieving, by the processor while the gaming machine is in a disabled state, an original hash value for the first area stored in a security data memory area from the security data memory area;
   computing a local hash value for the first area;
   comparing the original hash value and the local hash value to authenticate the first area while the gaming machine is in the disabled state;
   enabling operation of the gaming machine after successful authentication of the first area;
   retrieving, by the processor while the gaming machine is operating, a digital signature and a public key from the memory;
   decrypting the digital signature using at least the public key to generate a decrypted hash value; and
   comparing the decrypted hash value to the local hash value to authenticate the first area while the gaming machine is operating.

2. A method in accordance with claim 1 further comprising:
   identifying a plurality of areas of the memory; and
   authenticating each area of the plurality of areas using one or more public keys while the gaming machine is operating.

3. The method in accordance with claim 1, wherein the first area of the memory is further configured to store a public key for authenticating the first area while the gaming machine is operating, and wherein comparing the original hash value to the local hash value further authenticates the public key while the gaming machine is in the disabled state.

4. The method in accordance with claim 1, wherein the data security memory area is further configured to store the digital signature for authenticating the first area while the gaming machine is operating.

5. A gaming machine comprising a processor and a memory, said processor programmed to:
   identify a first area of the memory including one or more operational data components associated with operating the gaming machine;
   retrieve, while the gaming machine is in a disabled state, an original hash value for the first area stored in a security data memory area from the security data memory area;
   compute a local hash value for the first area;
   compare the original hash value and the local hash value to authenticate the first area while the gaming machine is in the disabled state;
   enable game play operation of the gaming machine after successful authentication of the first area;
   retrieve a digital signature and a public key from the memory;
   decrypt the digital signature using at least the public key to generate a decrypted hash value; and
   compare the decrypted hash value to the local hash value to authenticate the first area while the gaming machine is operating.

6. A gaming machine in accordance with claim 5, wherein said processor is further programmed to:
   identify a plurality of areas of the memory; and
   authenticate each area of the plurality of areas using one or more public keys while the gaming machine is operating.

7. A gaming machine in accordance with claim 5, wherein said first area of the memory is further configured to store a public key for authenticating the first area while the gaming machine is operating, and wherein the processor is further programmed to compare the original hash value to the local hash value to authenticate the public key while the gaming machine is in the disabled state.

8. A gaming machine in accordance with claim 5, wherein the data security memory area is further configured to store the digital signature for authenticating the first area while the gaming machine is operating.

9. One or more computer storage media embodying computer-executable instructions stored thereon for authenticating a memory of a gaming machine, the instructions comprising the steps of:
   identifying a first area of the memory including one or more operational data components associated with operating the gaming machine;
   retrieving, while the gaming machine is in a disabled state, an original hash value for the first area stored in a security data memory area from the security data memory area;
   computing a local hash value for the first area;
   comparing the original hash value and the local hash value to authenticate the first area while the gaming machine is in the disabled state;
   enabling operation of the gaming machine after successful authentication of the first area;
   retrieving a digital signature and a public key from the security data memory area;
   decrypting the digital signature using at least the public key to generate a decrypted hash value; and
   comparing the decrypted hash value to the local hash value to authenticate the first area while the gaming machine is operating.

10. The computer storage media of claim 9, wherein the instructions further comprise the steps of:
    identifying a plurality of areas of the memory; and
    authenticating each area of the plurality of areas using one or more public keys while the gaming machine is operating.

11. The computer storage media of claim 9, wherein the instructions further comprise the steps of:
    retrieving, from the first area of the memory, a public key for authenticating the first area while the gaming machine is operating; and
    comparing the original hash value to the local hash value to authenticate the public key while the gaming machine is operating.

12. The computer storage media of claim 9, wherein the instructions further comprise the steps of retrieving the digital signature from the security data memory area.

* * * * *